(12) United States Patent
Cattaneo

(10) Patent No.: US 6,345,590 B1
(45) Date of Patent: Feb. 12, 2002

(54) HEADER FOR MILKING UNITS PROVIDED WITH A FLOW ADJUSTER

(75) Inventor: Marco Cattaneo, Gariga di Podenzano (IT)

(73) Assignee: Milkline di Ratti Dr. Daniele, Gariga di Podenzano (IT)

(*) Notice: Subject to any disclaimer, the term of this patent is extended or adjusted under 35 U.S.C. 154(b) by 0 days.

(21) Appl. No.: 09/482,806

(22) Filed: Jan. 13, 2000

(30) Foreign Application Priority Data

Jan. 22, 1999 (IT) .......................... MI99A0118

(51) Int. Cl.⁷ ................................. A01J 5/00
(52) U.S. Cl. .................................... 119/14.55
(58) Field of Search .................... 119/14.54, 14.55, 119/14.43, 14.37

(56) References Cited

U.S. PATENT DOCUMENTS

| | | | | |
|---|---|---|---|---|
| 1,538,735 A | * | 5/1925 | Oden | |
| 2,651,290 A | * | 9/1953 | Hein | |
| 3,406,663 A | * | 10/1968 | Duncan | |
| 4,314,526 A | * | 2/1982 | Nordenskjold | 119/14.55 |
| 4,441,454 A | * | 4/1984 | Happel et al. | 119/14.36 |
| 4,907,535 A | * | 3/1990 | Matsuzawa et al. | 119/14.55 |
| 5,291,853 A | * | 3/1994 | Steingraber et al. | 119/14.54 |

\* cited by examiner

Primary Examiner—Peter M. Poon
Assistant Examiner—Kevin Jakel
(74) Attorney, Agent, or Firm—Bucknam and Archer

(57) ABSTRACT

A header for milking units comprising: a bell (15) for the collection of the milk closed by an upper wall (4); milked milk arrival ducts (9) with associated peripheral mouths (8) located on the upper wall (4); a discharge duct (17) fixed to the bell (15) and a flow adjuster (1) that accumulates the individual milk flows into a single and uniform circumferential flow that regularly discharge towards the discharge duct (17). The flow adjuster (1) comprises an upside-down mushroom-profiled body (2) provided with a device (3) for fastening to the header, and comprising a circular upper edge (7) and a dished bottom (12) connected to the upper edge (7); the circular upper edge (7) having a diameter smaller than the internal diameter of bell (15) and such as to align with mouths (8) of milk arrival ducts (9) and to form, with its external surface, one only continuous annular passage (14) with the internal surface of the bell.

10 Claims, 2 Drawing Sheets

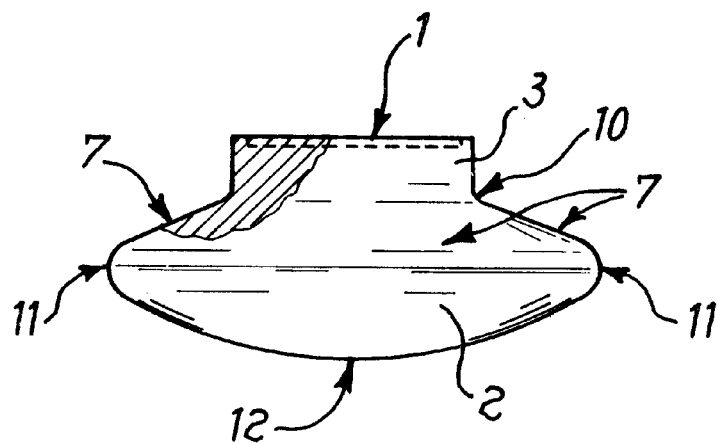
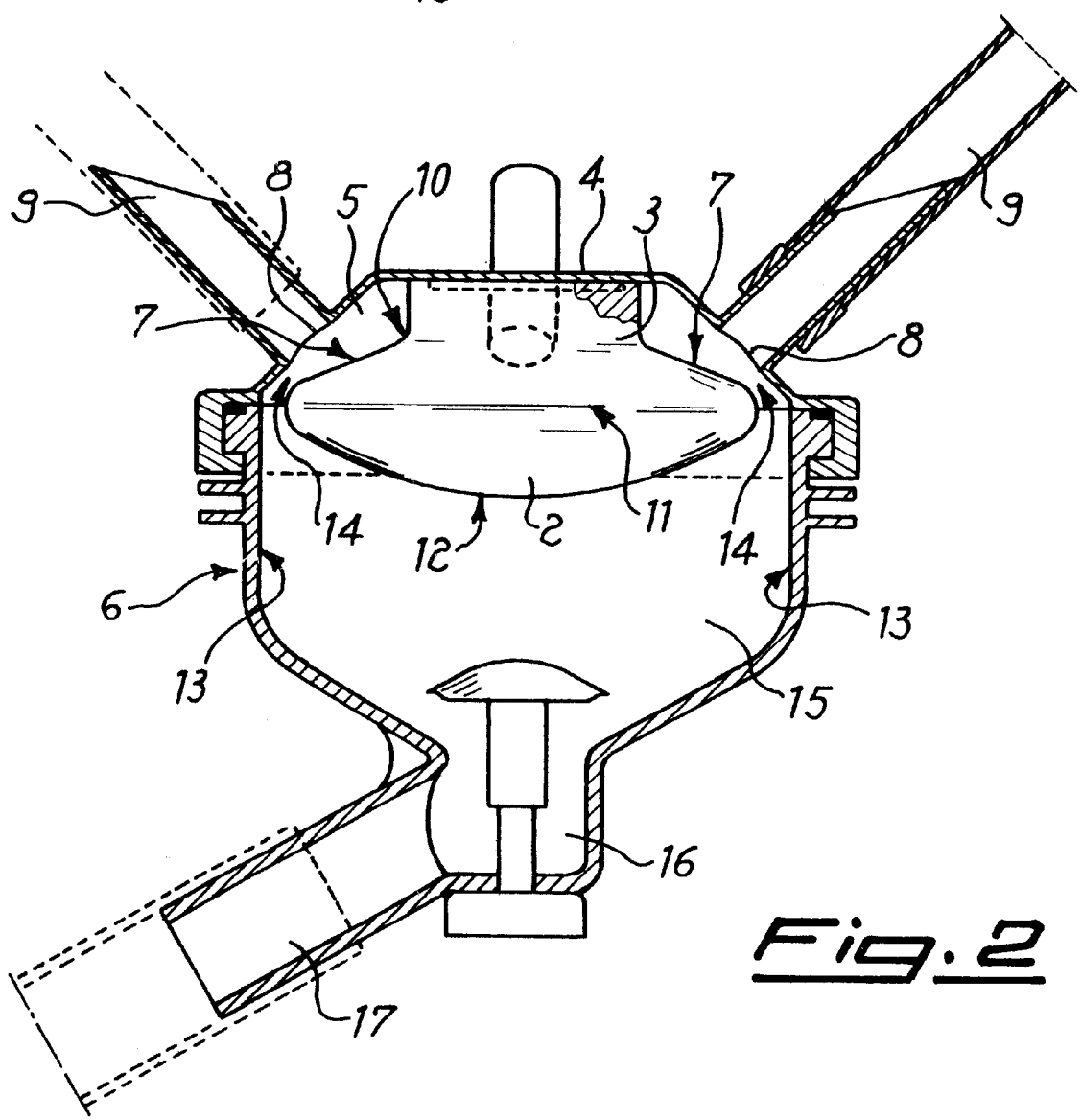

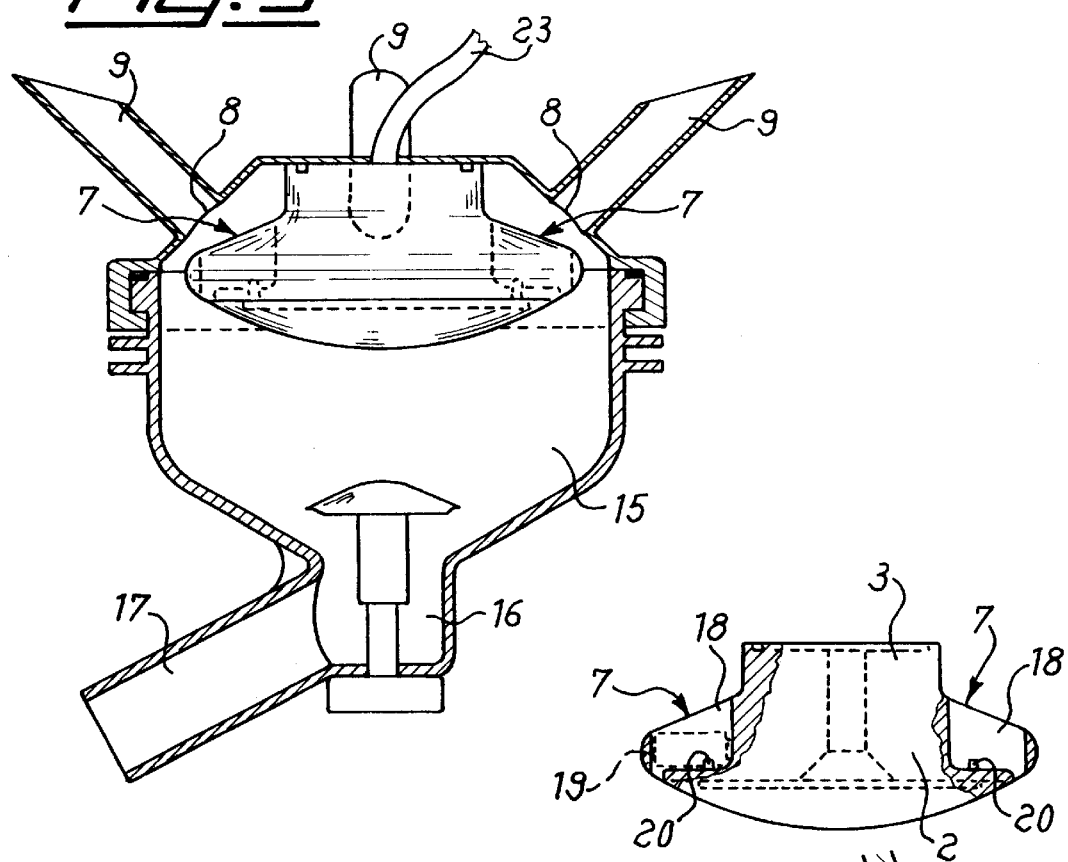
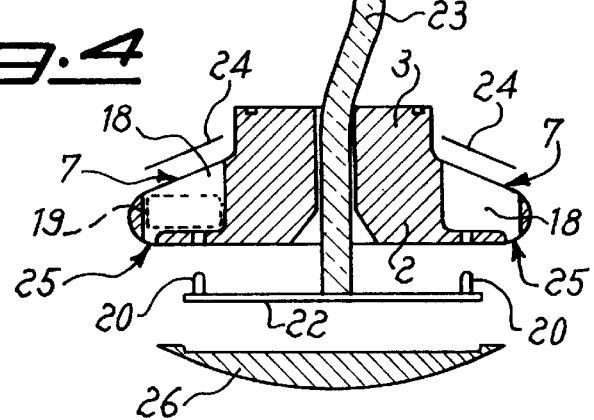
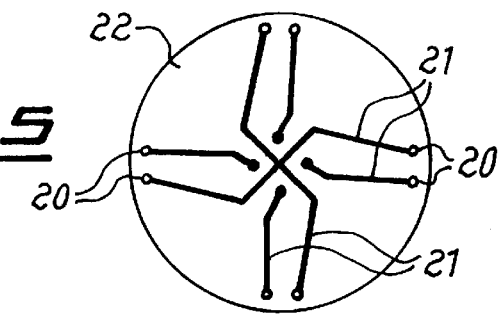

HEADER FOR MILKING UNITS PROVIDED WITH A FLOW ADJUSTER

DESCRIPTION

The present invention relates to a header for milking units provided with a flow adjuster.

More particularly, the present invention relates to a header for milking units provided with a flow adjuster having the function of adjusting vacuum fluctuations and of accelerating the evacuation of the milk extracted from the mammas.

As is known, in milking plants, the milking units are the means intended for extracting milk from animal mammas, in particular of bovines, sheep and goat.

The milking units are constituted by two or four nipple-takers (two for sheep and goat, four for bovines) and a header. Nipple-takers are applied to the mammas of the animals and, depending on vacuum action, extract the milk and convey it to the header. From the header, milk is evacuated through the special lower discharge tube that connects with the milk duct or, in any case, with milk connection means.

The main drawback of the known milking units arises from the fact that the alternate and intermittent milk flows coming from the nipple-takers intersect within the header, causing milk turbulences and accumulations that cause undesired vacuum fluctuations and non-correct and irregular evacuation of the milk from the lower discharge tube.

The various attempts adopted and proposed to eliminate or contain such drawback have not brought to significant and/or satisfying results.

Object of this invention is to eliminate such drawbacks of the known milking units.

More particularly, object of this invention is to provide a header for milking units such as to allow a correct evacuation of milk from the lower discharge tube in a regular and accelerated manner, free from milk turbulences and accumulation.

From its more general aspect, the present invention allows to obtain these and other objects, which will result from the following description, arranging in the inside of the header, in alignment with the peripheral mouths of the arrival ducts of the milked milk, a flow adjuster having such a shape as to unite the individual milk flows into a single and uniform circumferential flow that regularly discharges downwards, improving the fluid-mechanic characteristics of said flow in the inside of the header. Therefore, object of this invention is a header for milking units comprising: a bell for milk collection closed by an upper wall; milked milk arrival ducts with associated peripheral mouths located on said upper wall; a discharge duct fixed to the bottom of said bell and a flow adjuster comprising an upside-down mushroom-profiled body provided with means for fastening to said header, and comprising a circular upper edge and a dished bottom connected to said upper edge; said circular upper edge having a diameter smaller than the internal diameter of the bell and such as to align with the mouths of milk arrival ducts and to form, with its external surface, one only continuous annular passage with the internal surface of the bell and the external one of said upper edge.

The particular surface profile imparts the mushroom-profiled body the functions of a circumferential baffle-conveyor bent-tile, adjuster of vacuum fluctuations, accelerator of the evacuation of milk extracted from mammas, improving the fluid-mechanic characteristics of the header. Said baffle-conveyor aligns with all the entry mouths of the header of milked milk arrival ducts from mammas and imparts to the milk coming from milking a uniform motion directed towards and along the whole internal wall of the header, adjusting its flow and preventing the formation of vacuum fluctuations, with the consequence of accelerating its evacuation towards the ducts or the milk collection means.

Besides improving the fluid-mechanic characteristics of the header, the particular configuration of the mushroom-profiled body allows also the application on it of cells for the control of electric conductivity and/or other physical and chemical parameters of milk. The cells may be as many as the entry mouths of milk arrival ducts and are located into peripheral recesses oriented in alignment with said ducts, in this way, it is possible to control during milking the electric conductivity of milk and/or its possible physical and/or chemical parameters, without interfering with the above indicated fluid-mechanic functionalities indicated above.

The cells may be protected by upper filters that adequate uninterruptedly to the baffle-conveyor surface profile of the mushroom-profiled body.

A further advantage of the flow adjuster of the present invention lays in that it may be produced in any desired size and therefore it may be applied and adopted on all the known headers available on the market or new construction ones.

The constructive and functional characteristics of the header of the present invention will be better understood thanks to the following description, wherein reference is made to the figures of the attached drawings that represent some embodiments solely given by way of non limiting example, and wherein:

FIG. 1 shows the schematic side view of the upside-down mushroom-profiled body that constitutes the flow adjuster of the header of the present invention;

FIG. 2 shows the schematic view of a cross-section of the header of the present invention provided with the upside-down mushroom-profiled body of FIG. 1;

FIG. 3 shows the schematic view of a cross-section of a second embodiment of the header of the present invention provided with a mushroom-profiled baffle-conveyor body, complete with control cells;

FIG. 4 shows the schematic views of a side section, complete respectively exploded, of the upside-down mushroom-profiled baffle-conveyor body of FIG. 3, and FIG. 5 shows the plan schematic view of an example of electric connections of control cells for a mushroom-profiled body of headers for bovines, provided with four milked milk arrival ducts from mammas.

With reference to the figures, the flow adjuster (1), represented in a non limiting example, comprises an upside-down mushroom-profiled body (2) and an upper cylindrical panel or stem (3).

The upside-down mushroom-profiled body (2) comprises an upper circular edge (7) connected to stem (3) by means of a first upper connection (10), and a dished bottom (12) connected to the circular edge (7) by means of a second lower connection (11).

Thanks to the specific round and connected configuration, the mushroom-profiled flow adjuster (2) is designed to be so positioned that its upper circular edge (7) is substantially aligned with the peripheral mouths (8) of milked milk arrival ducts (9), from mammas to header.

The particular circular and dished profile of the mushroom-profiled body (2), with an upper radiate connection (10) towards the panel or stem (3) and with a lower radiate connection (11) towards its dripping dished bottom (12), imparts to said profiled body the function of a baffle-conveyor bent-tile that associates to the internal peripheral surface (13) of bell (15) at a distance specifically contained and sufficient to create a single continuous annular passage (14).

The alternated jets of milked milk that enter the header through mouths (8) get in touch with the upper edge (7) of the mushroom-profiled baffle-conveyor body (2), expand on the same, convey and distribute along its whole circumferential surface and discharge downwards, through said annular passage (14), according to an almost one only, continuous, regular, peripheral, constant-speed flow that runs on all the internal wall of bell (15), until it collects without turbulences in the lower part (16) and discharges from the header through the discharge tube (17).

In substance, the mushroom-profiled body (2) is a baffle-conveyor able to accumulate the individual milk flows into one only uniform circumferential flow that discharges regularly downwards, improving the fluid mechanic characteristics of said flow in the inside of the header, excluding vacuum fluctuations, ensuring the constant maintenance of the vacuum level and improving the evacuation of milk extracted from mammas, that takes place in a regular, constant, quicker manner without accumulations.

In FIGS. 3–5, the mushroom-shaped body (2) is shown in a second embodiment that comprises not only the above represented and described configuration, but also additional functions concerning the real time control of specific technical data of the milked milk, such as electric conductivity and/or other important physical and chemical parameters.

In an embodiment, given only by way of non limiting example, the upside-down mushroom baffle-conveyor profiled body (2) with or without the upper cylindrical panel or integral stem (3), is provided on the upper edge (7) with as many peripheral recesses (18) as are the milk arrival ducts (9) from mammas. Recesses are aligned with ducts (9) and constitute the seats within which as many control cells (19) are obtained.

Said cells that are fed with electric energy through specific electric through-connections (20) and conductors (21) applied to a supporting plate (22) located in the inside of the mushroom-shaped body and transmit the gathered data to an external center, not shown, by means of a multipolar cable (23). The supporting plate (22) is embedded or rigidly fastened in the inside of the mushroom-profiled body (2) with a lower covering (26) whose external surface is so configured as to form the dished dripping bottom (12) of the mushroom-profiled body (2). Cells (19) are protected in the upper part by filters (24) that cover recessions (18), adjusting uninterruptedly to the surface profile of the upper edge (7) of said mushroom.

A part of the milk coming from the arrival ducts (9) passes through filters (24), gets in touch with cells (19), flows on the same and discharge through holes (25) into the inside of bell (15), to recompose then with the general milk flow that collects in the lower part (16) and exits from the header through discharge (17).

In the above described examples, the upside-down mushroom-profiled baffle-conveyor body (2) is integral with an upper cylindrical panel or stem (3) that constitutes the means by which said body is easily fastened to the upper part (4) of lid (5) of a header (6) for milking units and so centered as to be coaxial with bell (15). It is evident that such solution arises from the fact of being simple, economical and easily adoptable for the application of mushroom (2) on the most part of the known headers, either of new construction or already in use. However, this is no limitation as the same upside-down mushroom-profiled baffle-conveyor body (2), in its described configuration and the specified functions, may be provided, for other applications or different type plants, with different means for fastening to headers (6), such as for instance: peripheral embedding radial supports on lids (4) or the internal surfaces (13) of bells (15), lower column-like or radial central supports, or the like.

Thanks to its specific configuration and its structural characteristics, the upside-down mushroom-profiled baffle-conveyor body (2) may be associated to headers (6) for milking units either as organic component of said headers of new production or as an accessory component for headers already used, improving their fluid mechanic characteristics and possibly providing said headers with means for the control of the physical and chemical characteristics of milked milk.

Even though the present invention has been described and illustrated above according to embodiments solely given by way of non limiting example, various modifications and variants may be included within the protection scope of the following claims.

What is claimed is:

1. A header for milking units comprising:
   a) a bell (15) for the collection of the milk having an internal surface and closed by an upper wall (4);
   b) milked milk arrival ducts (9) with associated peripheral mouths (8) located on said upper wall (4);
   c) a discharge duct (17) fixed to said bell (15); and
   d) a flow adjuster (1) having an upside-down mushroom-profiled body and provided with upper fastening means (3) for fastening said flow adjuster (1) to the inside of the upper wall (4) of the bell (15) in alignment with the peripheral mouths (8) of the milked milk arrival ducts (9) and forming with the internal surface of the bell one only continuous annular passage (14) to accumulate individual milk flows of the arrival ducts (9) into only one uniform, annular and continuous flow that discharges towards the discharge duct.

2. The header for milking units according to claim 1, wherein said upside-down mushroom-profiled body (2) comprises a circular upper edge (7) and a dished bottom (12) connected to said upper edge (7) by means of a radiate connection (11), said upper circular edge (7) having a diameter smaller than the internal diameter of the bell (15) and such as to align with mouths (8) of milk arrival ducts (9).

3. The header for milking units according to claim 2, wherein said upside-down mushroom-profiled body (2) is provided on the upper edge (7) with peripheral recesses (18) aligned with milk arrival ducts (9).

4. The header for milking units according to claim 3, wherein the number of the peripheral recesses (18) is the same as the number of milk arrival ducts (9) from mammas.

5. The header for milking units according to claim 3, wherein the peripheral recesses (18) contain control cells (19).

6. The header for milking units according to claim 5, wherein control cells (19) are fed with electric energy through conductors (20, 21) applied to a supporting plate (22) embedded and rigidly fastened in the inside of body (2) by means of a lower covering (26) having a dished bottom; said control cells being connected to an external control center by means of a multipolar cable (23).

7. The header for milking units according to claim 6, wherein said control cells (19) are protected by filters (24) that cover recesses (18).

8. The header for milking units according to claim 2, wherein the means for fastening the upside-down mushroom-profiled body (2) to the header is constituted by an upper cylindrical panel or stem (3) integral with said body (2), connected to the upper circular edge (7) by means of a connection (10) and fastened to the middle of upper wall (4) in a position coaxial with said bell (15).

9. The header for milking units according to claim 2, wherein the means for fastening the upside-down mushroom-profiled body (2) to the header comprises peripheral embedded radiate supports on wall (4) or the internal surfaces (13) of the bell.

10. The header for milking units according to claim 2, wherein the means for fastening the upside-down mushroom-profiled body (2) to the header comprises lower column-like or radiate central supports.

* * * * *